April 2, 1968            J. KLERER            3,376,481

THIN FILM CAPACITOR

Filed Oct. 31, 1966

INVENTOR
J. KLERER
BY
Edward M. Fink
ATTORNEY

United States Patent Office 3,376,481
Patented Apr. 2, 1968

3,376,481
THIN FILM CAPACITOR
Julius Klerer, Plainfield, N.J., assignor to Bell Telephone Laboratories, Incorporated, Berkeley Heights, N.J., a corporation of New York
Filed Oct. 31, 1966, Ser. No. 590,941
5 Claims. (Cl. 317—258)

This invention relates to tantalum thin film capacitors. More particularly, the present invention relates to tantalum thin film capacitors including anodized low density tantalum counterelectrodes.

Among the more promising capacitors presently in use in the electronics industry is the tantalum thin film capacitor. This device is conventionally constructed by depositing a thin film of tantalum upon a substrate as, for example, by cathodic sputtering or vacuum evaporation, partially anodizing the freshly deposited film in order to obtain a dielectric oxide layer, and finally depositing a counterelectrode in direct contact with the anodized film. Heretofore, the materials most commonly employed as a counterelectrode in devices of htis type have been either gold or Nichrome-gold.

Unfortunately, it has been observed that tantalum capacitors prepared in this manner evidence a certain degree of instability of capacitance when exposed to changes in relative humidity. These variations in capacitance have been attributed in part to diffusion of water through the counterelectrode material and absorption of the water at the counterelectrode-dielectric oxide interface. Studies of tantalum oxide capacitors including gold or Nichrome-gold counterelectrodes have revealed variations in capacitance of the order of 3 percent and 0.5 percent, respectively, during cycling between 0 percent and 87 percent relative humidity.

Although variations in capacitance of this order of magnitude are tolerable in most applications, the advent of precision networks, such as the notch filter utilized in telephony applications, has created a need for a tantalum thin film capacitor evidencing variations in capacitance of the order of 0.1 percent or lower during humidity cycling. Recently a device meeting this requirement was described by J. Klerer in copending application Ser. No. 558,914, filed Mar. 9, 1966. The inventive device described therein included a counterelectrode comprising Nichrome-aluminum. Although devices of this type have proven satisfactory, slight deviations in capacitance have been noted after prolonged periods of time.

In accordance with the present invention, a tantalum thin film capacitor meeting the requirements set forth above and evidencing enhanced stability as compared with the device employing the Nichrome-aluminum counterelectrode is described. The inventive device is fabricated by depositing a thin film of tantalum upon a substrate by condensation techniques, partially anodizing the tantalum layer to form a tantalum oxide dielectric layer, depositing a layer of low density tantalum by cathodic sputtering techniques upon said tantalum oxide layer, and partially anodizing the said counterelectrode. Devices of the described type have been found to evidence variations in capacitance ranging from 0.05 percent to 0.02 percent and lower when subjected to humidity cycling from 0 percent to 87 percent relative humidity at 25° C. and variations in capacitance ranging down to less than 0.02 percent when subjected to 87 percent relative humidity at 25° C. for several months.

The invention will be more readily understood by reference to the following detailed description taken in conjunction with the accompanying drawing, wherein.

Figure 1:
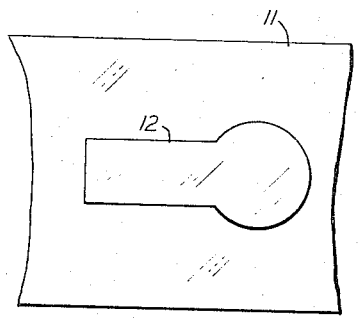
FIG. 1 is a plan view of a substrate with a layer of tantalum deposited thereon.

With further reference now to FIG. 1 there is shown a substrate 11 upon which a metallic pattern is to be produced in accordance with the present invention. The substrate selected should desirably be able to withstand temperatures ranging as high as 400° C. since they may be subjected to such temperatures during the deposition stage of the processing. Preferred substrate materials for this purpose are glasses, glazed ceramics, and so forth.

Initially substrate 11 is cleansed by conventional techniques well known to those skilled in the art. Following the cleansing stage a layer of tantalum 12 is deposited upon substrate 11 by conventional procedures as, for example, cathodic sputtering, vacuum evaporation, and so forth, as described by L. Holland in "Vacuum Deposition of Thin Films," John Wiley & Sons, New York, 1956.

For the purposes of the present invention, the minimum thickness of the layer deposited upon the substrate is dependent upon two factors. The first of these is the thickness of the metal which is converted into the oxide form during the subsequent anodizing step. The second factor is the minimum thickness of unoxidized metal remaining after anodization commensurate with the maximum resistance which can be tolerated in the film-forming metal electrode. It has been determined that the preferred minimum thickness of the metal electrode is approximately 1000 A. There is no maximum limit on this thickness although little advantage is gained by the increase above 10,000 A.

For anodizing voltages up to 250 volts, it has been determined that a metal deposit of at least 4000 A. is preferred. It is considered that of this 4000 A. a maximum of approximately 2000 A. is converted during the anodizing step, leaving approximately 2000 A. as the electrode thickness.

Figure 2:
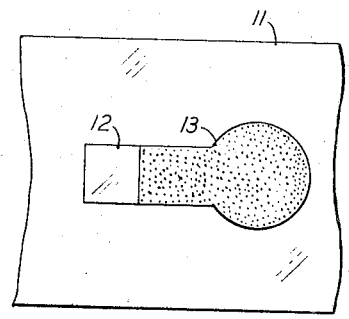
FIG. 2 is a plan view of the body of FIG. 1 after partial anodization thereof.

Following the deposition step tantalum layer 12 is anodized in an appropriate electrolyte, so resulting in an oxide film 13 shown in FIG. 2.

The voltage employed during the anodizing step is primarily determined by the voltage at which the resulting device is to be operated. Suitable electrolytes for this purpose are oxalic acid, citric acid, and so forth.

The next step in the fabrication of a thin film capacitor in accordance with the invention involves the deposition of a low density tantalum counterelectrode upon the structure of FIG. 2. For the purposes of the present invention, the term "low density tantalum" is defined as tantalum evidencing a density less than 16 grams cm.$^{-3}$, and preferably within the range of 10–12 grams cm.$^{-3}$. It has been determined that tantalum of normal density, 16 grams cm.$^{-3}$ and greater, results in structures evidencing high leakage currents and numerous short-circuits. It has been theorized that such behavior is caused by damage done to the dielectric oxide layer by the impinging high energy tantalum atoms. Accordingly, it is essential that the tantalum film deposited be of low density; that is, produced by means such that essentially no damage occurs to the anodic oxide film.

Figure 3:
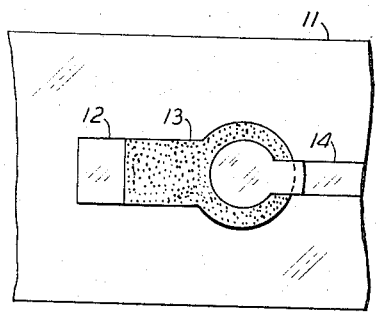
FIG. 3 is a plan view of the body of FIG. 2 after the deposition thereon of a low density tantalum counterelectrode.

It has been further determined that the low density tantalum films required herein may only be obtained by cathodic sputtering techniques utilizing sputtering voltages ranging from 800–2500 volts and partial pressures of sputtering gases ranging from 10–100 microns of Hg. Deviations from the noted minima fail to generate the required glow discharge whereas deviations from the noted maxima result in the production of normal density tantalum. The structure, including the low density tantalum counterelectrode is shown in FIG. 3 in plan view and in FIG. 4 in cross-sectional view, 14 representing the counterelectrode.

For the purpose of the present invention the minimum thickness of the counterelectrode deposited upon the dielectric oxide is dependent upon the same factors discussed above with respect to the base electrode. Accordingly, it has been determined that the preferred minimum thickness of the counterelectrode may range down to 1000 A.; however, practical considerations dictate the use of minimum thicknesses of approximately 2000 A. Again, there is no maximum limit on the thickness, although little advantage is to be gained by the increase above 10,000 A.

Figure 4:
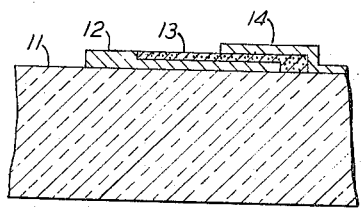
FIG. 4 is a cross-sectional view of the body of FIG. 3.
Figure 5:
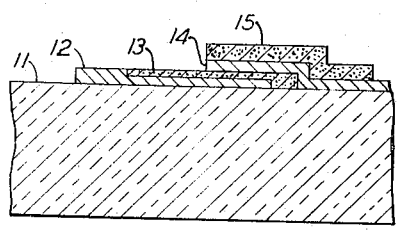
FIG. 5 is a cross-sectional view of the body of FIG. 4 after partial anodization of the counterelectrode.

Following the deposition of the counterelectrode, the structure of FIG. 4 is subjected to further anodization, thereby resulting in the formation of a second anodic tantalum oxide layer 15, as shown in FIG. 5. For anodizing voltages ranging up to 150 volts, it has been determined that a metal deposit of at least 2000 A. is preferred for the counterelectrode. It is considered that of this 2000 A. a maximum of approximately 1000 A. is converted during the anodizing step, leaving approximately 1000 A. as the electrode thickness. The device is now complete and ready for humidity cycling.

In order that those skilled in the art may more fully understand the inventive concept herein presented, the following example is given by way of illustration and not limitation.

EXAMPLE

A 1" x 3" glass microscope slide was employed as the substrate and cleaned with ultrasonic detergent washes and boiling hydrogen peroxide in accordance with conventional techniques. Thereafter the substrate was positioned in a cathodic sputtering apparatus and a layer of tantalum 4000 A. in thickness deposited in a 15 spot pattern thereon through a mechanical mask. Following, the tantalum layer was anodized in a 0.01 percent aqueous solution of citric acid until a voltage of 200 volts was attained. At that point the assembly was left to anodize for 30 minutes at constant voltage. Next, the assembly was backetched for five seconds at 75 volts in a 0.01 percent solution of aluminum chloride in methanol in order to eliminate defects in the tantalum pentoxide dielectric layer. Then, the assembly was reanodized for 30 minutes at the original anodizing voltage in citric acid. Next, a low density tantalum counterelectrode was deposited upon the anodized film by cathodic sputtering techniques at 1500 volts and 300 milliamperes with an argon pressure of 35 microns of Hg. Sputtering was conducted for 80 minutes, so resulting in a low density tantalum counterelectrode 4000 A. in thickness. Following, the counterelectrode was anodized in a 0.01 percent aqueous solution of citric acid until a voltage of 150 volts was attained. At that point, the assembly was left to anodize for 30 minutes at constant voltage, so resulting in the formation of an oxide layer 2240 A. in thickness.

The completed capacitor assembly was then inserted in a Pyrex battery jar having a Plexiglas cover slotted to accommodate up to 8 printed circuit "cinch" trays, which in turn accommodated the life test fixtures which held the samples. All sources of leaks between the cinch trays and the Plexiglas and air were sealed. Final sealing was accomplished by using sealing wax on the entire junction of jar to cover. Constant humidity conditions were obtained with the following salt solutions:

*Constant humidity solutions*

| Solution: | RH |
|---|---|
| Sodium carbonate ($Na_2Co_3.10H_2O$) | 87% (30° C.) |
| Sodium nitrite ($NaNo_2$) | 66% (20° C.) |
| Potassium nitrite ($KNo_2$) | 45% (20° C.) |
| Lithium chloride ($LiCl.H_2O$) | 15% (20° C.) |

A hygrometer and thermometer were placed in the battery jar and the entire assembly placed in a humidity-controlled room. Capacitance measurements were made with a parallel capacitance bridge by means of a connection cinch tray. For comparative purposes, the procedure described above was repeated with the exception that Nichrome-gold counterelectrodes or Nichrome-aluminum counterelectrodes were employed. The results for repeated humidity cycling between 0 percent and 87 percent relative humidity at 25° C. and humidity cycling for five months are shown in the table set forth below.

TABLE

| Counterelectrodes | $\Delta C/C \times 100$ (0%–87% RH) | | 5 Months at 87% RH, 25° C., $\Delta C/C \times 100$ |
|---|---|---|---|
| | Before | After | |
| Low Density Tantalum | 0.53 | 0.02 | 0.005 |
| Do | 0.31 | 0.04 | 0.02 |
| Do | 0.32 | 0.03 | 0.02 |
| Do | 0.28 | 0.04 | <0.02 |
| Nichrome-Gold | | 0.5 | 0.1 |
| | | 0.02 | 0.05 |
| Nichrome-Aluminum | | 0.05 | 0.1 |

As noted in the table, the capacitors produced in accordance with the present invention were superior to those devices including Nichrome-gold counterelectrodes and were equivalent to those devices including Nichrome-alumina counterelectrodes from the standpoint of moisture sensitivity during humidity cycling from 0 percent to 87 percent relative humidity. However, the devices of the present invention evidenced a marked stability in capacitance as compared with either prior art device after humidity cycling at 87 percent relative humidity at 25° C. for five months.

While the invention has been described in detail in the foregoing specification and the drawing similarly ilustrates the same, it will be understood by those skilled in the art that variations may be made without departing from the spirit and scope of the invention.

What is claimed is:

1. A thin film capacitor including successively a substrate member, a layer of tantalum, an oxide layer of tantalum, a low density tantalum counterelectrode evidencing a density less than 16 grams cm.$^{-3}$, and an oxide layer on said low density tantalum.

2. A capacitor in accordance with claim 1 wherein said oxide layer of low density tantalum is at least 800 A. in thickness.

3. A process for the fabrication of a thin film capacitor comprising the steps of depositing a layer of tantalum upon a substrate, partially anodizing said tatalum layer whereby there is formed a dielectric oxide layer, depositing a layer of low density tantalum evidencing a density less than 16 grams cm.$^{-3}$ upon said oxide layer by cathodic sputtering techniques at voltages ranging from 800–2500 volts at partial pressures of sputtering gas ranging from 10–100 microns of Hg, and partially anodizing said low density tantalum layer.

4. A process in accordance with claim 3 wherein said low density tantalum counterelectrode is deposited in a thickness of at least 4000 A. by cathodic sputtering of tantalum at 1500 volts with a partial pressure of argon of 35 microns of Hg.

5. A process in accordance with claim 4 wherein said oxide layer of low density tantalum is obtained by partially anodizing the said counterelectrode at 150 volts, so resulting in an oxide layer approximately 2240 A. in thickness.

References Cited

UNITED STATES PATENTS 3,264,537   8/1966   Delaney et al. _____ 317—258

DARRELL L. CLAY, *Primary Examiner.*

E. GOLDBERG, *Assistant Examiner.*